Patented Aug. 21, 1934

1,970,662

UNITED STATES PATENT OFFICE 1,970,662

AZO DYESTUFF INSOLUBLE IN WATER AND FIBER DYED THEREWITH

Leopold Laska and Arthur Zitscher, Offenbach-on-the-Main, Germany, assignors to General Aniline Works, Inc., New York, N. Y., a corporation of Delaware No Drawing. Application August 7, 1931, Serial No. 555,860. In Germany August 15, 1930

12 Claims. (Cl. 260—97)

Our present invention relates to azodyestuffs insoluble in water and to fiber dyed therewith.

These dyestuffs correspond probably to the general formula:

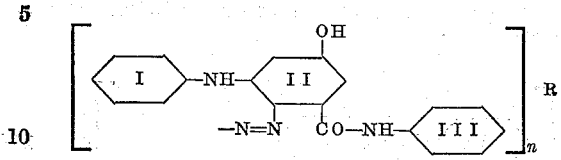

wherein the nuclei I and III may be substituted by alkyl, alkoxy or halogen, $n$ means the number 1 or 2 and R an aromatic radical of the benzene, naphthalene or anthracene series which may be substituted by alkyl, alkoxy, aryloxy, halogen or nitro groups.

Throughout this specification the combining components of our dyestuffs (shown in the above formula within the brackets) are named for the sake of convenience "(3-hydroxy-diphenylamine-5-carbonyl) amino-benzenes"

The dyestuffs may be produced in substance and used for making color lakes or they may be prepared on fibers. As fibers suitable for the production of these dyestuffs thereon may be named: cotton, wool, native and regenerated cellulose (viscose), ethers and esters of cellulose (acetate silk).

When these dyestuffs are prepared on the fiber according to the ice-color method an intermediate drying operation may be dispensed with on account of the affinity of the arylamides to the fibers. Thereby mainly brown dyeings are produced, ranging to brownish black and black according to the diazo compound used, especially suitable for the batic style of dyeing.

The (3-hydroxy-diphenyl-amine-5-carbonyl)-amino-benzenes used as combining components in the production of our new dyestuffs may be prepared according to U. S. Patent No. 1,893,091 by condensing 3.5-dihydroxy-benzoic acid with 2-molecular proportions of an arylamine or by condensing a 1-arylamino-3-hydroxy-5-benzoic acid (described in the aforesaid U. S. Patent) with an aryl amine.

In order to further illustrate our invention, the following examples are given. We wish it, however, to be understood that we are not limited to the particular products or reaction conditions mentioned therein.

Example 1

Well boiled and dried cotton yarn is impregnated with a solution containing per liter 10 grs. of 1-(4'-chloro-3-hydroxy-diphenylamine-5-carbonyl) amino-4-chloro-benzene, 20 cc. of caustic soda lye of 34° Bé., 20 cc. of Turkey red oil and 15 grs. of common salt. The goods are well wrung out and developed with a solution containing per liter the diazo compound of 1.62 grs. of 2.5-dichloro-1-amino-benzene and being neutralized with sodium bicarbonate. Then they are rinsed and soaped at the boil.

In this manner a reddish brown dyeing is obtained. The dyestuff thus produced on the fiber corresponds probably to the formula:

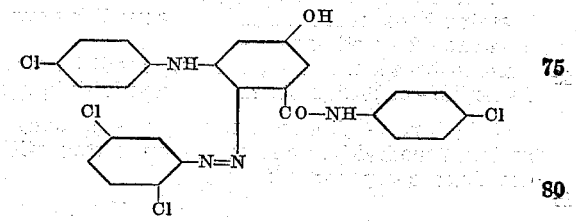

By developing the impregnated goods with diazotized:

| | |
|---|---|
| 4-chloro-2-nitro-1-amino-benzene | a reddish brown |
| 5-chloro-2-methyl-1-amino-benzene | a yellowish brown |
| 4-nitro-2-methoxy-1-amino-benzene | a dark reddish brown |
| 1-amino-anthraquinone | a reddish brown dyeing is produced. |

Example 2

Acetate silk (100 grs.) previously treated in a suitable manner are impregnated at 60–70° C. for one hour in a bath containing in 3 liters 1 gr. of 1-amino-naphthalene, 2 cc. of hydrochloric acid of 20° Bé. and 15 grs. of sodium acetate.

After rinsing the impregnated goods are diazotized in a solution containing in 3 liters 6 grs. of sodium nitrite and 15 cc. of hydrochloric acid of 20° Bé., then rinsed and developed in a bath containing in 3 liters 2 grs. of (3-hydroxy-diphenyl-amine-5-carbonyl)-amino-benzene and 2 cc. of caustic soda solution of 34° Bé.

After rinsing and soaping a reddish brown dyeing is obtained. The dyestuff thus produced on the fiber corresponds probably to the formula:

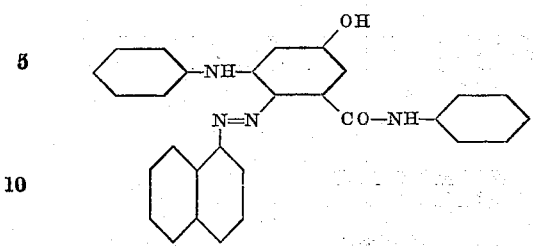

The same arylamide yields with the diazo compound of 4-amino-azobenzene a brownish orange, with that of 4'-amino-benzene-1'-1-azo-4-amino-naphthalene a blackish brown, with half the molecular proportion of tetrazotized 4.4'-diamino-3.3'-dimethoxy-diphenyl a reddish brown dyeing.

1-(3-hydroxy-4'-chloro - diphenylamine - 5 - carbonyl) amino-2-methyl-benzene yields with the diazo compound of 4-amino-azo-benzene a brownish orange, with that of 1-amino-naphthalene a brown dyeing.

The following table shows the shades of some other combinations of this kind:

(3-hydroxy-diphenyl-amine-5-carbonyl)-amino-benzene yields on cotton with the diazo compound of:

| | Shades |
|---|---|
| 3 - chloro - 1 - amino - benzene | an orange brown |
| 2.5 - dichloro - 1 - amino - benzene | a reddish brown |
| 2.4.5 - trichloro-1-amino-benzene | a reddish brown |
| 5 - chloro - 2 - phenoxy - 1 - amino-benzene | a reddish brown |
| 4 - nitro - 2 - methoxy - 1 - amino-benzene | a dark reddish brown |
| 1 - amino - anthraquinone | a reddish brown |

1-(3-hydroxy - diphenylamine - 5 - carbonyl) amino-4-methyl-benzene yields on cotton with the diazo compound of:

| | Shades |
|---|---|
| 2.5 - dichloro - amino-benzene | a reddish brown |
| 2.5 - dichloro - 4 - methyl - 1 - amino-benzene | a brownish red |
| 4 - chloro-2-nitro-1-amino-benzene | an orange brown |

1 - (3-hydroxy - 4' - chloro-diphenylamine-5-carbonyl) amino-2-methyl-benzene yields on cotton with the diazo compoud of:

| | Shades |
|---|---|
| 2.5-dichloro-1-amino-benzene | an orange brown |

1-(3-hydroxy-4'-chloro-diphenylamine - 5 - carbonyl) amino-4-chloro-benzene yields on viscose with the diazo compound of:

| | Shades |
|---|---|
| 2.5 - dichloro - 1 - amino - benzene | a brownish orange |
| 2 - amino - 4 - chloro - diphenyl - ether | a copper |

1 - (3 - hydroxy - 4' - methyl - diphenylamine - 5-carbonyl) amino-4-methyl-benzene yields on wool with the diazo compound of:

| | Shades |
|---|---|
| 5 - chloro - 2 - methyl - 1 - amino - benzene | a brownish red |
| 3 - chloro - 1 - amino-benzene | a brownish red |
| 5 - chloro - 2 - methoxy-1-amino - benzene | a brownish claret red |

1-(3-hydroxy - 4' - methoxy - diphenylamine-5-carbonyl)-amino-4-methoxy-benzene yields on cotton with the diazo compound of:

| | Shades |
|---|---|
| 2.5 - dichloro - 1 - amino-benzene | a brown |
| 2 - amino - 4 - chloro - diphenylether | a brown |

The structural formulæ given for our new azo dyestuffs are correct to the best of our knowledge and belief. However, it has not yet been possible to definitely determine the exact structure of these new azo dyestuffs. For example, it is conceivable that the azo group may be attached to the phenyl nucleus II in one of the ortho-positions to the hydroxyl group instead of in para-position, as indicated in the structural formulæ given. Consequently we wish it understood that when such structural formulæ are employed in the appended claims, they are intended to define the new azo dyestuffs which we have described and which may be obtained in acordance with our disclosure.

We claim:

1. The azo dyestuffs corresponding to the general formula:

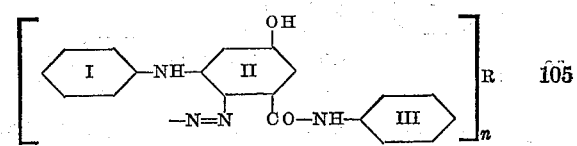

wherein the nuclei I and III may be substituted by alkyl, alkoxy or halogen, $n$ means the number 1 or 2 and R an aromatic radical of the benzene, naphthalene or anthracene series which may be substituted by alkyl, alkoxy, aryloxy, halogen or nitro groups, which compounds are insoluble in water and yield when produced on fibers brownish to black dyeings.

2. The azo dyestuffs corresponding to the general formula:

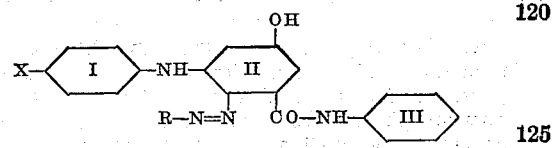

wherein X means alkyl, alkoxy or halogen, the nucleus III may be substituted by alkyl, alkoxy or halogen and R means an aromatic radical of the benzene, naphthalene or anthracene series which may be substituted by alkyl, alkoxy, aryloxy, halogen or nitro groups, which compounds are insoluble in water and yield when produced on fibers brownish dyeings.

3. The azo dyestuffs corresponding to the general formula:

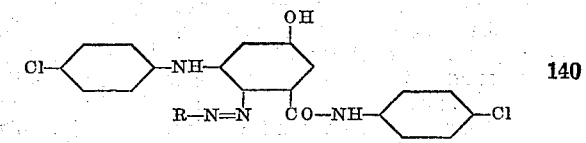

wherein R means an aromatic radical of the benzene, naphthalene or anthracene series which may be substituted by alkyl, alkoxy, aryloxy, halogen or nitro groups, which compounds are insoluble in water and yield when produced on fibers brownish dyeings.

4. The azo dyestuff corresponding to the formula:

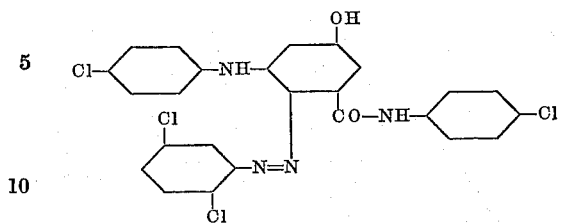

which compound is insoluble in water and yields when produced on fibers reddish brown dyeings.

5. The azo dyestuff corresponding to the formula:

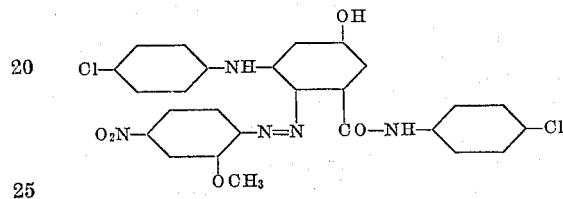

which compound is insoluble in water and yields when produced on fibers dark reddish brown dyeings.

6. The azo dyestuff corresponding to the formula:

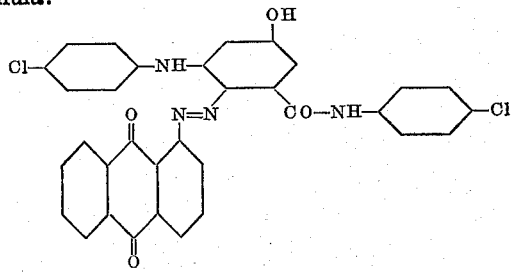

which compound is insoluble in water and yields when produced on fibers reddish brown dyeings.

7. Fiber dyed with the azo dyestuffs as claimed in claim 1.
8. Fiber dyed with the azo dyestuffs as claimed in claim 2.
9. Fiber dyed with the azo dyestuffs as claimed in claim 3.
10. Fiber dyed with the azo dyestuff as claimed in claim 4.
11. Fiber dyed with the azo dyestuff as claimed in claim 5.
12. Fiber dyed with the azo dyestuff as claimed in claim 6.

LEOPOLD LASKA.
ARTHUR ZITSCHER.